United States Patent
Oroskar et al.

(10) Patent No.: US 9,681,344 B1
(45) Date of Patent: Jun. 13, 2017

(54) DIFFERENTIAL HANDLING OF BUFFERED DATA DURING HANDOVER BASED ON WHETHER HANDOVER TARGET IS A RELAY WITH WIRELESS BACKHAUL

(71) Applicant: Sprint Spectrum L.P., Overland Park, KS (US)

(72) Inventors: Siddharth S. Oroskar, Overland Park, VA (US); Nitesh Manchanda, Overland Park, VA (US); Jasinder P. Singh, Olathe, KS (US); Rajil Malhotra, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/953,629

(22) Filed: Nov. 30, 2015

(51) Int. Cl.
*H04W 36/02* (2009.01)
*H04W 36/08* (2009.01)
*H04W 36/00* (2009.01)
*H04W 88/08* (2009.01)

(52) U.S. Cl.
CPC ..... *H04W 36/023* (2013.01); *H04W 36/0061* (2013.01); *H04W 36/08* (2013.01); *H04W 88/08* (2013.01)

(58) Field of Classification Search
CPC ..... H04W 40/22; H04W 40/24; H04W 88/04; H04W 88/00; H04W 88/02; H04W 88/06; H04W 8/18; H04W 8/20; H04W 8/24; H04W 36/0066; H04W 36/0072; H04W 36/0077; H04W 36/0083; H04W 36/00; H04W 36/002; H04W 36/28; H04W 36/02; H04W 36/023; H04W 36/06; H04W 36/08; H04W 36/16; H04W 36/38; H04W 36/0016; H04W 4/18; H04W 36/0061; H04W 36/34
See application file for complete search history.

(56) References Cited

U.S. PATENT DOCUMENTS

| 7,177,304 | B1 | 2/2007 | Mo et al. | |
|---|---|---|---|---|
| 9,072,039 | B2 * | 6/2015 | Hu | H04W 48/20 |
| 2008/0062911 | A1 * | 3/2008 | Choi | H04B 7/155 370/315 |
| 2012/0028631 | A1 * | 2/2012 | Chun | H04L 1/1614 455/422.1 |
| 2012/0264368 | A1 * | 10/2012 | Aminaka | H04B 7/155 455/9 |
| 2014/0301360 | A1 * | 10/2014 | Bontu | H04W 36/0083 370/331 |
| 2015/0271063 | A1 * | 9/2015 | Godor | H04W 88/04 455/404.1 |

* cited by examiner

*Primary Examiner* — Meless Zewdu (57) ABSTRACT

A method and system for transferring buffered downlink data for a wireless communication device (WCD) from a source base station to a target base station as part of a handover of the WCD from the source to the target base station. The source base station may have downlink data for transmission to the WCD buffered during the handover. A determination may be made as to whether or not the target base station is a relay base station with a wireless backhaul. If the target base station is determined to be a relay base station with a wireless backhaul, then the source base station may refrain from transmitting at least one portion of the buffered data to the target base station.

18 Claims, 6 Drawing Sheets

DIFFERENTIAL HANDLING OF BUFFERED DATA DURING HANDOVER BASED ON WHETHER HANDOVER TARGET IS A RELAY WITH WIRELESS BACKHAUL

BACKGROUND

Unless otherwise indicated herein, the description provided in this section is not itself prior art to the claims and is not admitted to be prior art by inclusion in this section.

A typical wireless network includes a number of base stations each radiating to provide coverage in which to serve wireless communication devices (WCDs) such as cell phones, tablet computers, tracking devices, embedded wireless modules, and other wirelessly equipped devices. In turn, each base station may be coupled with network infrastructure that provides connectivity with one or more transport networks, such as the public switched telephone network (PSTN) and/or the Internet for instance. With this arrangement, a WCD within coverage of the network may engage in air interface communication with a base station and may thereby communicate via the base station with various remote network entities or with other WCDs served by the base station.

Further, a wireless network may operate in accordance with a particular air interface protocol (i.e., radio access technology), with communications from the base stations to WCDs defining a downlink or forward link and communications from the WCDs to the base stations defining an uplink or reverse link. Examples of existing air interface protocols include, without limitation, wireless wide area network (WWAN) protocols such as Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1xRTT and 1xEV-DO), and Global System for Mobile Communications (GSM), and wireless local area network (WLAN) protocols such as IEEE 802.11 (WIFI), BLUETOOTH, and others. Each protocol may define its own procedures for registration of WCDs, initiation of communications, handover or handoff between coverage areas, and other functions related to air interface communication.

In practice, a base station may be configured to provide service to WCDs on multiple carrier frequencies or "carriers." Each carrier could be a time division duplex (TDD) carrier that defines a single frequency channel multiplexed over time between downlink and uplink use, or a frequency division duplex (FDD) carrier that defines two separate frequency channels, one for downlink communication and one for uplink communication. Each frequency channel of a carrier may then occupy a particular frequency bandwidth (e.g., 1.4 MHz, 3 MHz, 5 MHz, 10 MHz, or 20 MHz) defining a range of frequency at a particular position (e.g., defined by a center frequency) in a radio frequency band (e.g., in the 800 MHz band, the 1.9 GHz band, or the 2.5 GHz band).

Each carrier may also define various logical channels to facilitate communication between the base station and one or more served WCDs. For instance, on the downlink, a carrier may define a reference channel on which the base station broadcasts a reference signal useable by WCDs to detect and evaluate coverage, various other downlink control channels to carry control signaling (such as resource-scheduling directives) to WCDs, and one or more shared or traffic channels for carrying bearer data (e.g., user or application level data) to WCDs. And on the uplink, a carrier may define one or more uplink control channels to carry control signaling (such as resource scheduling requests, channel state reports, and the like) from WCDs, and one or more shared or traffic channels for carrying bearer data from WCDs. In practice, the shared or traffic channels may define particular physical resources for carrying data between the base station and WCDs.

When a WCD enters into coverage of a base station, the WCD may attach, register, or otherwise associate with the base station, and the base station may then serve the WCD on one or more carriers. The base station may then be referred to as the WCD's "serving" base station. Herein, the term "serving" will, in general, be used to describe a particular base station as such only when it is not otherwise apparent from context. In practice, the process of serving the WCD may involve the serving base station allocating use of particular air interface resources, such as traffic channels or portions thereof, to carry data communications to and from the WCD, and managing transmission on those resources, such as controlling what modulation scheme is used for the transmissions.

For instance, when the serving base station has data to transmit to the WCD, the serving base station may select certain downlink resources to carry the data and may determine a modulation scheme for transmission on those resources, and the base station may then (i) transmit to the WCD a scheduling directive instructing the WCD to receive the data on the scheduled resources using the determined modulation scheme, and (ii) transmit the data on the indicated downlink resources using the determined modulation scheme. Likewise, when the serving base station receives from the WCD a request for the WCD to transmit data to the base station, the base station may select certain uplink resources to carry the data and may determine a modulation scheme for transmission on those resources, and the base station may then (i) transmit to the WCD a scheduling directive instructing the WCD to transmit the data on the scheduled resources using the determined modulation scheme and (ii) receive the transmission from the WCD accordingly.

A WCD may also move between neighboring coverage areas of base stations. More specifically, as a WCD moves between wireless coverage areas of a wireless communication system, or when network conditions change or for other reasons, the WCD may "handover" (or "hand off") from operating in one coverage area (e.g., a serving coverage area) to operating in another coverage area. In a usual case, this handover process is triggered by the WCD monitoring the signal strength of various nearby available coverage areas, and the serving base station (or some other controlling network entity) determining when one or more threshold criteria are met. For instance, a WCD may continuously monitor signal strength from various available coverage areas and notify its serving base station when a given coverage area has a signal strength that is sufficiently higher than that of the serving base station. The serving base station (or some other controlling network entity) may then direct the WCD to handover to the base station of the given coverage area. By convention, a WCD is said to handover from a "source" base station (or source coverage area) to a "target" base station (or target coverage area). At the time that a handover is triggered, the source base station is the WCD's serving base station.

OVERVIEW

A serving base station of a WCD will typically receive at least a portion of downlink data for the WCD from the wireless network in which the base station is configured for operation. For example, user data for the WCD may be delivered from the network to the base station in the context of a data communication session (e.g., streaming media data, web browsing data, etc.), and the base station may then transmit the downlink data over an air interface to the WCD. User data from the network may also be voice data delivered to the base station in the context of a voice communication session (e.g., a voice call). Additionally or alternatively, downlink data for the WCD may originate at the serving base station. Such data could include control messages, or the like, generated at or by the base station. In either case, the serving base station may buffer some or all downlink data for the WCD before transmitting it to the WCD. Buffering of downlink data may be employed to accommodate scheduling of communications with multiple WCDs, to help manage bandwidth on the downlink air interface, or other reasons relating to traffic flow, for instance.

When a WCD is handed over from a source (serving) base station to a target base station, there may be some buffered data at the source base station that the source base station does not transmit before the handover is complete. In order to help ensure that such buffered data are not left undelivered to the WCD, the handover procedure usually includes some mechanism or protocol for transferring remaining buffered data from the source base station to the target base station. Once the handover is complete and the target base station becomes the WCD's new serving base station, it can transmit the transferred buffered data to the WCD. Under LTE, for example, base stations can communicate directly with each other via an "X2" connection. In such a case, transfer of buffered data for a WCD from a source to a target base station can be made over an X2 connection between the source and target base stations as part of a handover of the WCD from the source to the target base station.

As described below, some wireless communication networks (e.g., under LTE) support one or another form of "relay base station" in which a WCD (possibly in conjunction with an auxiliary application or device) can function as a small base station for other WCDs within its wireless range. The WCD of a relay base station is referred to as a "relay WCD." In such a case, instead of having a dedicated backhaul link to the wireless network, the relay base station has a wireless backhaul supported by, or overlaid on, an air interface connection between its relay WCD and the relay WCD's serving base station. Thus, for a relay base station, the types of traffic usually supported on connections between a base station and the network are supported on the wireless backhaul.

For a relay base station involved in a handover of a WCD, the wireless backhaul supports control signaling and other aspects of handover communications that are typically carried on one or more links between a base station and the network (possibly including other base stations). In particular, if a relay base station is a target base station of a handover of a WCD, downlink data for the WCD that are buffered at the source base station will be transmitted to the relay base station over the wireless backhaul between the relay WCD and its serving base station. Note that the source base station of the WCD in the handover may or may not be the serving base station of the relay WCD of the relay base station.

Under conventional operation, all downlink data that remain buffered at the source base station at the completion of (or during) a handover to relay base station will be transmitted to the relay base station over its wireless backhaul. However, this can impose a traffic burden on the air interface between the relay WCD and its serving base station, possibly resulting in latency of other communications carried on this air interface, as well as other forms of service degradation. At the same time, there may be types of downlink data that are not critical, or whose omission may not be unacceptable, to communications with the WCD in the handover. Yet, when such non-critical data remain buffered at a source base station after handover of the WCD to a relay base station, the wireless backhaul will, under conventional operation, be subject to the traffic burden transferring all the remaining buffered data to the relay base station, even downlink data that can be acceptably omitted. In accordance with example embodiment, the disadvantages of conventional operation in this and similar circumstances can be overcome by recognizing when a target base station of a handover is a relay base station with a wireless backhaul, and responsively refraining from transmitting some or all buffered downlink data from the source base station to the target base station.

Hence, in one respect, various embodiments of the present invention provide a method of data transfer during handover of a wireless communication device (WCD) from a source base station to a target base station, the method comprising: making a determination that the target base station is a relay base station with a wireless backhaul connection to the source base station, wherein the source base station has downlink data for transmission to the WCD buffered during the handover; and in response to making the determination, the source base station refraining from transmitting at least one portion of the buffered data to the target base station.

In another respect, various embodiments of the present invention provide a base station configured for transferring data during handover of a wireless communication device (WCD) from the base station to a target base station, the base station comprising: an air interface for wireless communications with one or more WCDs; one or more processors; memory accessible by the one or more processors; and machine-readable instructions stored in the memory, that upon execution by the one or more processors cause the base station to carry out operations including: making a determination that the target base station is a relay base station with a wireless backhaul connection to the base station, wherein the base station has downlink data for transmission to the WCD buffered during the handover; and in response to making the determination, refraining from transmitting at least one portion of the buffered data to the target base station.

In still another respect, various embodiments of the present invention provide a non-transitory computer-readable medium having instructions stored thereon that, upon execution by one or more processors of a base station configured for transferring data during handover of a wireless communication device (WCD) from the base station to a target base station, cause the base station to carry out operations including: making a determination that the target base station is a relay base station with a wireless backhaul connection to the base station, wherein the base station has downlink data for transmission to the WCD buffered during the handover; and in response to making the determination, refraining from transmitting at least one portion of the buffered data to the target base station.

These as well as other aspects, advantages, and alternatives will become apparent to those of ordinary skill in the art by reading the following detailed description, with reference where appropriate to the accompanying drawings. Further, it should be understood that the descriptions pro-

DETAILED DESCRIPTION

The present method and apparatus will be described herein in the context of LTE as an example air interface protocol and associated network arrangement. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
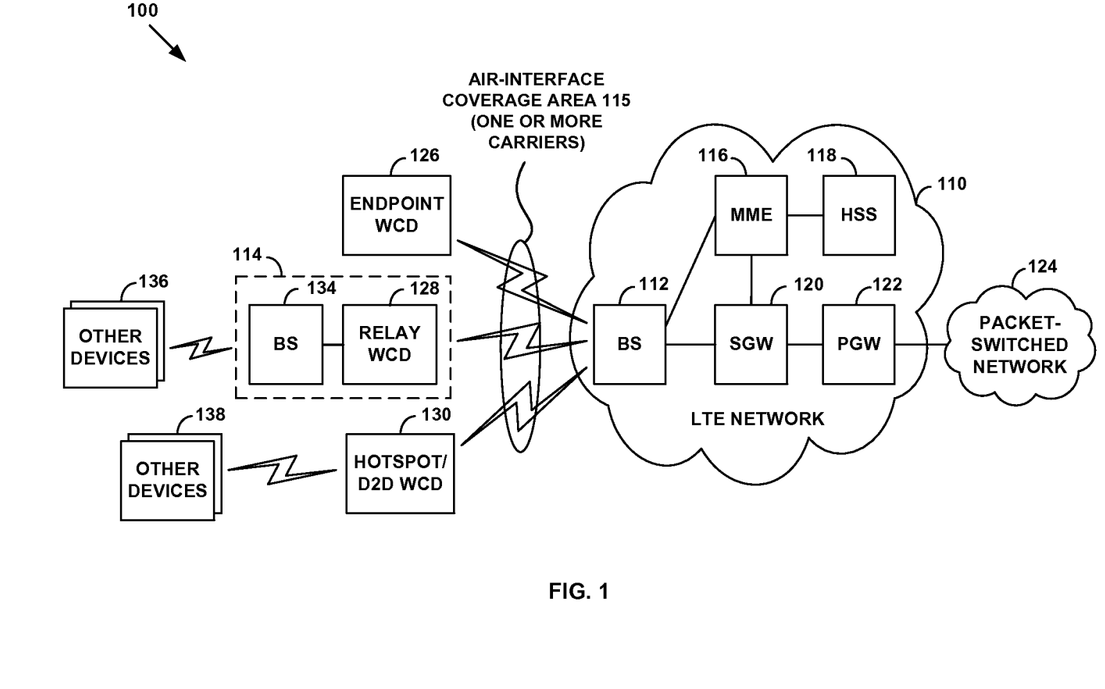
FIG. 1 is a simplified block diagram of a wireless communication system in which the present method and system can be implemented.

Referring to the drawings, as noted above, FIG. 1 is a simplified block diagram of a wireless communication system 100 in which the present method and system can be implemented. In particular, FIG. 1 depicts a representative LTE network 110, which functions primarily to serve WCDs with wireless packet data communication service, including possibly voice-over-packet service, but may also provide other functions. As shown, the LTE network 110 includes a base station (LTE evolved Node-B (eNodeB)) 112, which has an antenna structure and associated equipment for providing an LTE coverage area 115 in which to serve the WCDs. The base station 112 then has a communication interface with a mobility management entity (MME) 116 that functions as a signaling controller for the LTE network 110 and has a communication interface with a home subscriber server (HSS) 118. Further, the base station 112 has a communication interface with a serving gateway (SGW) 120, which in turn has a communication interface with a packet-data-network gateway (PGW) 122 that provides connectivity with a packet-switched network 124 such as the Internet, and the MME 118 has a communication interface with the SGW 120. In practice, the illustrated components of the LTE network 110 may sit as nodes on a private packet-switched network owned by an operator of the LTE network 110, and thus the various communication interfaces may be logical interfaces within that network.

In addition, FIG. 1 illustrates three example WCDs 126, 128, 130 being served by the base station 112 over air interface 115 (e.g., within a particular coverage area of the base station). WCD 126 is typical end-user WCD such as a cell phone or wirelessly-equipped computer, tablet, or other device that does not provide connectivity for at least one other device. WCDs 128 and 130, on the other hand, are WCDs that provide connectivity for at least one other device. In particular, WCD 128 is connected, configured, or otherwise arranged as a relay WCD coupled or integrated with a small cell base station (also referred to as a "mini-macro base station") 134 or the like in a relay base station 114, that is in turn configured (similar to base station 112) to serve other devices 136. So WCD 128 functions as an intermediary between base station 112 and any devices served by small cell base station 134, with the air interface connection between WCD 128 and base station 112 functioning as a wireless backhaul link for the small cell base station 134. And WCD 130 is configured as a hotspot or device-to-device (D2D) WCD (such as a cell phone having a personal-hotspot feature), similar to the relay WCD, to function as an intermediary between base station 112 and one or more other devices 138.

In practice, when any such WCD enters into coverage of base station 112, the WCD may engage in a process to attach with, handover to, or otherwise associate with the base station, which may result in establishment of a radio link layer connection (e.g., radio resource control (RRC) connection) over the air between the WCD and the base station and preparation of the network to facilitate serving the WCD. For instance, the WCD may transmit an attach request to the base station, which the base station may forward to the MME, and the MME may then engage in signaling to control setup of one or more bearers for carrying data for the WCD between the PGW and the base station. Further, in this attach process, the WCD may convey to the base station information about the WCD's profile and configuration, and the MME may also receive WCD profile and configuration information from the HSS and convey that information to the base station, and the base station may store this information in a local context record for the WCD.

The base station may then serve the WCD, scheduling downlink and uplink communications as discussed above for instance. In particular, if the base station receives from the SGW data to be transmitted to the WCD, the base station may schedule and engage in transmission of the data to the WCD using an appropriate modulation scheme. And if the WCD requests transmission of data to the base station, the base station may schedule transmission of the data from the WCD using an appropriate modulation scheme, and the WCD may transmit the data accordingly.

Further, if a WCD provides connectivity for one or more other devices, the radio link layer connection between the WCD and the base station 112 may also carry signaling and bearer data related to each such other device. For instance, considering relay WCD 128, the small cell base station 134 may operate as a base station of the LTE network, but its communications with other entities in the LTE network (such as with an SGW and MME) would occur via the relay WCD 128 and via the radio link layer connection between the relay WCD 128 and the base station 112. Thus, when data is to be transmitted from the LTE network to a device served by the small cell base station 134, base station 112 would schedule and transmit that data over the air to the relay WCD 128, the relay WCD 128 would then pass the data to the small cell base station 134, and the small cell base station 134 would then schedule and transmit the data over the air to the served device. Likewise, when a device served by the small cell base station 134 transmits data to the small cell base station 134 for transmission on the packet-switched network 124, the small cell base station 134 would then pass the data to the relay WCD 128, and the relay WCD 128 would then work with base station 112 to facilitate transmission of the data over the air to base station 112. A similar but simpler arrangement may apply as well with a hotspot/D2D WCD.

Figure 2:
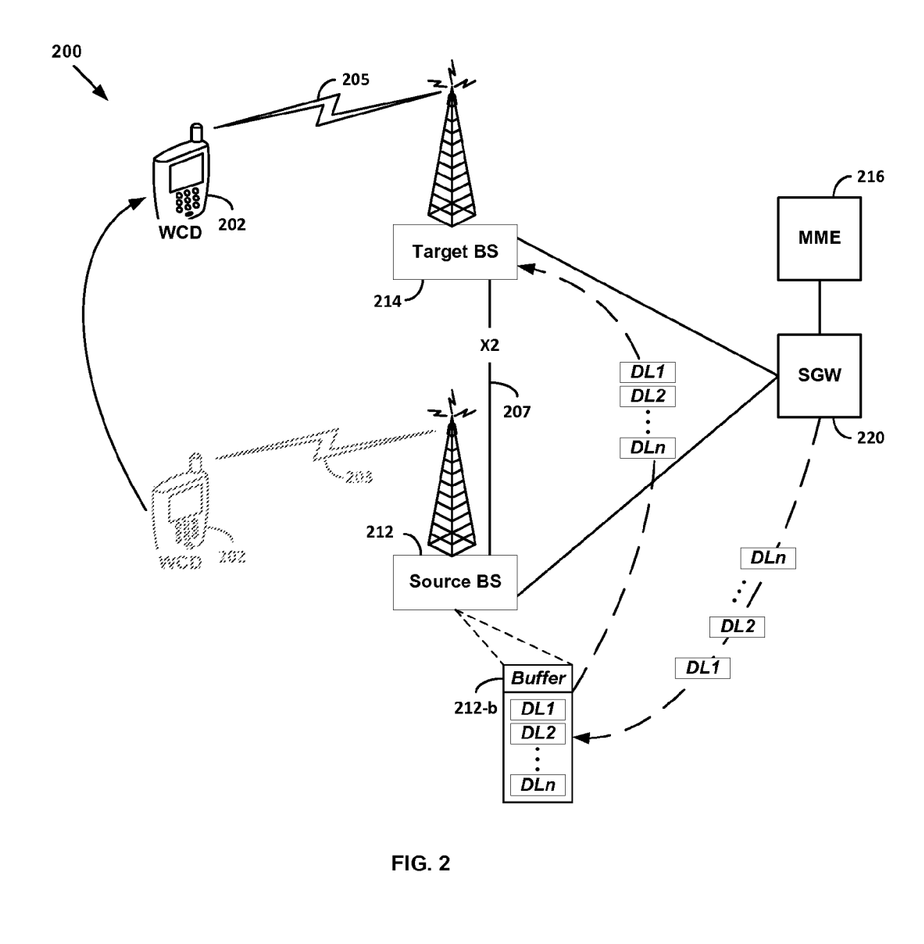
FIG. 2 illustrates handover operation in an example scenario.

FIG. 2 illustrates a handover operation in a wireless network 200 in accordance with an example scenario. By way of example, the wireless network 200 includes two base stations 212 and 214 connected to each other with an X2 link 207, and each connected to a SWG 220, which in turn is connected to a MME 216. For the sake of brevity in FIG. 2, other LTE network elements, such as those illustrated in FIG. 1 (e.g., HSS and PGW), have been omitted. The network 200 also includes a WCD 202 shown, for the purposes of illustration, at two locations meant to represent pre-handover and post-handover operation (as well as possibly intra-handover operation). As a visual cue of the handover, the WCD 202 is depicted in faded gray lines at its pre-handover location, and in dark black lines at its post-handover location.

Also for purposes of illustration, the base station 212 is taken to be the source base station of the handover operation, and the base station 214 is taken to be the target base station of the handover operation. Thus, at the time the handover operation is initiated, the source base station 212 is the serving base station of the WCD 202 (and WCD 202 is depicted at its pre-handover location); communications between the source base station 212 and the WCD 202 are supported on the air interface 203, as represented in the figure. While serving the WCD 202, the source base station may receive downlink data for the WCD from the network, such as from SGW 220 in illustration of FIG. 2. The downlink data from the network are represented as downlink "packets" (or the like) labeled "DL1," "DL2," . . . "DLn," and by the curved dashed arrow from the SGW 220 to source base station 212, as shown. The source (serving) base station 212 may buffer some or all of the downlink data in a buffer 212-b before transmitting it to the WCD 202. Buffering downlink data for transmission may help a base station schedule downlink transmissions among multiple served WCDs, allow prioritization of transmissions, and support other forms management of downlink air interface resources, among other functions. Note that some downlink data may originate at the source base station 212, rather than arrive from the network. For example, one or another type of control data may be generated by the source base station (or, more generally, from a serving base station).

Once the handover of the WCD 202 to the target base station 214 is complete (represented by WCD 202 at its post-handover location), or at some point during the handover procedure, the buffered data packets DL1, DL2, . . . DLn are transferred from the source base station 212 to the target base station 214. Under LTE, this transfer may be achieved by transmission of the packets over the X2 link between the source and target base stations. In FIG. 2, the transfer is represented by the curved dashed arrow from the source base station 212 to the target base station 214. Once the transferred data are received at the target base station, the target base station may then transmit the downlink data to the WCD 202 over the air interface 205, which is established as part of the handover procedure.

When the target base station of a handover is a relay base station, such as the relay base station 114 shown in FIG. 1, operational communications relating to the handover are carried on the wireless backhaul between the relay base station and its serving base station. Such communications include, in particular, buffered downlink data at the source base station that are transmitted to the target base station, as described above. Since the wireless backhaul also supports all other communications between the wireless base station and the network relating to base station operations, including user traffic and control signaling, the transmission of buffered downlink data to the target (relay) base station can put a strain on the air interface resources on which the wireless backhaul is carried. The result can be added latency to transmissions on the air interface between the relay WCD and it serving base station. Other types of service degradation can result as well.

At the same time, some or all of the buffered downlink data remaining at a source base station after a handover may not be critical in a particular downlink communication context to which they belong. For such communications there might not be any, or at least any unrecoverable, consequences if some or all of buffered downlink data were never delivered to the intended WCD. For example, some user-plane communication sessions may employ "keep-alive" packets (or data) that are transmitted periodically to signal to an endpoint (e.g., a WCD) that the communication session is still active during intervals in which actual data transmissions may be absent or infrequent. This can help prevent the session from mistakenly being dropped or terminated due to apparent lack of activity. Another example is "comfort noise" packets (or data), which are used to simulate natural-sounding audio noise in a media stream when an absence of actual media data in the stream might be perceived as complete silence at a receiving endpoint (e.g., a WCD). Typically, keep-alive packets are transmitted with a period shorter than an inactivity timer whose expiration might cause a session to drop. Similarly, comfort noise intervals may be set or be responsive to a timer that tracks the absence of media data in an otherwise active media stream. In either case, the typical time required to complete a handover may be shorter than timers associated with keep-alive and or comfort noise techniques, so that leaving such packets, buffered at the source base station, undelivered to the intended WCD at completion of a handover may have little or no adverse impact on a communication session with the WCD. There may be other types of data that can be "safely" left undelivered in the source base station's buffer.

Under conventional handover operation (e.g., for LTE), all downlink data left in the source base station's buffer at the completion of a handover are transmitted to the target base station. Consequently, there is no way to avoid or reduce latency or congestion caused by transmission of these buffered data on a relay base station's wireless backhaul: all the buffered downlink data—even those that may be non-critical—will be transmitted as part of the handover procedure. However, in accordance with example embodiments, the disadvantages of unconditionally transmitting buffered downlink data on a wireless backhaul from a source base station to a target (relay) base station can be avoided or eliminated by recognizing that the target base station is a relay base station, and responsively refraining from transferring some or all buffered downlink data from the source base station to the target base station.

Figure 3:
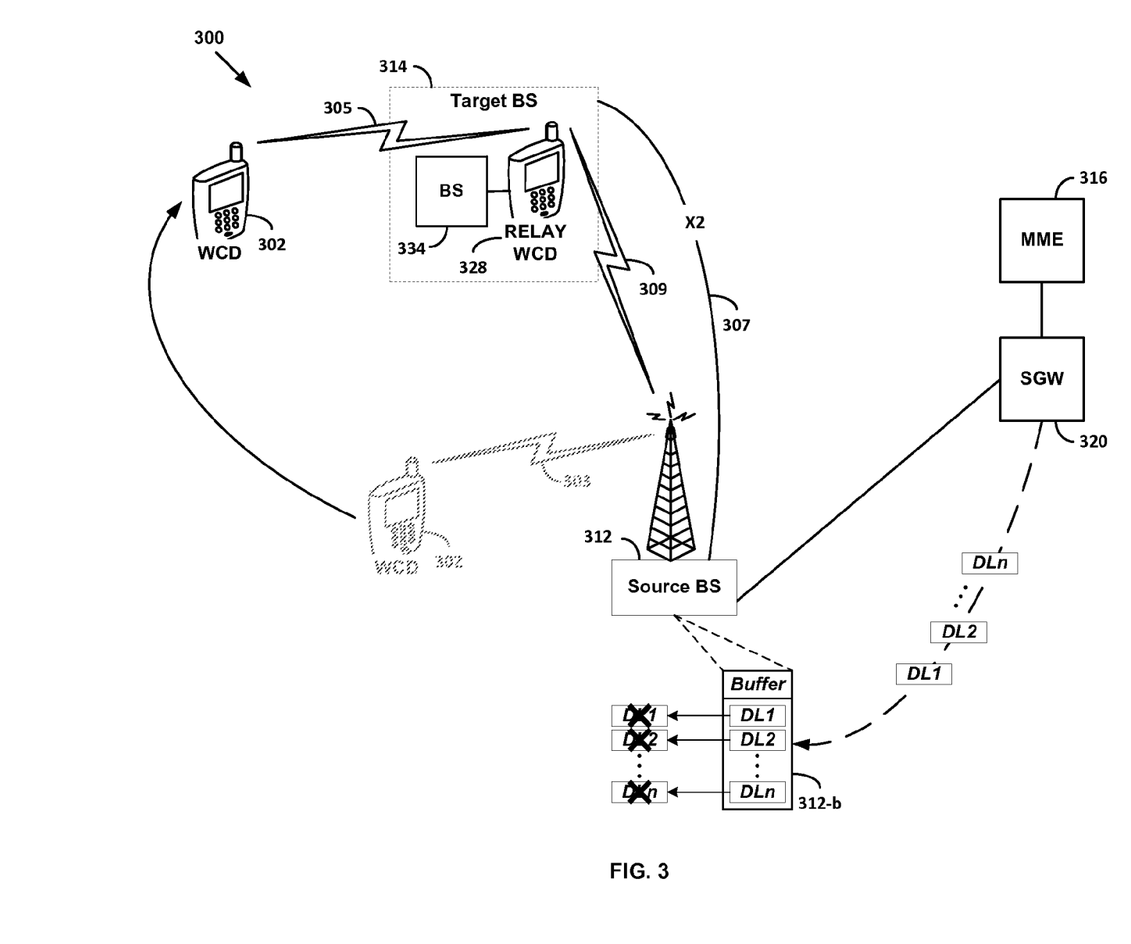
FIG. 3 illustrates handover operation in accordance with example embodiments.

Operation of an example handover to a target base station that is a relay base station with a wireless backhaul is illustrated in FIG. 3, in accordance with example embodiments. As shown, FIG. 3 depicts a wireless network 300 including a base station 312 and a relay base station 314 that includes a relay WCD 328 acting in conjunction with a small cell base station 334. By way of example, the base station 312 is the serving base station for the relay base station 328, with wireless communications carried over an air interface 309. The air interface 309, in turn, supports a wireless backhaul for the relay base station 314. As also shown, a wireless X2 link between the relay base station 314 and the base station 312 is supported over the wireless backhaul. The base station 312 is connected to a SWG 320, which in turn is connected to a MME 316. For the sake of brevity in FIG. 3, other LTE network elements, such as those illustrated in FIG. 1 (e.g., HSS and PGW), have been omitted. The network 300 also includes a WCD 302 shown, for the purposes of illustration, at two locations meant to represent pre-handover and post-handover operation (as well as possibly intra-handover operation). As a visual cue of the handover, the WCD 302 is depicted in faded gray lines at its pre-handover location, and in dark black lines at its post-handover location.

Also for purposes of illustration in the example of FIG. 3, the base station 312 is taken to be the source base station of the handover operation, and the relay base station 314 is taken to be the target base station of the handover operation. Thus, at the time the handover operation is initiated, the source base station 312 is the serving base station of the WCD 302 (and WCD 302 is depicted at its pre-handover location); communications between the source base station 312 and the WCD 302 are supported by the air interface 303, as represented in the figure. While serving the WCD 302, the source base station may receive downlink data for the WCD from the network, such as from SGW 320 in illustration of FIG. 3. As in FIG. 2, the downlink data from the network in FIG. 3 are represented as downlink "packets" (or the like) labeled "DL1," "DL2," ... "DLn," and by the curved dashed arrow from the SGW 320 to source base station 312, as shown. The source (serving) base station 312 may buffer some or all of the downlink data in a buffer 312-*b* before transmitting it to the WCD 302. Once again, some downlink data may originate at the source base station 312, rather than arrive from the network.

However, unlike under conventional operation, once the handover of the WCD 302 to the relay target base station 314 is complete (represented by WCD 302 at its post-handover location), the buffered data packets DL1, DL2, ... DLn, are not transferred from the source base station 312 to the relay target base station 314. At least not all of the buffered data are necessarily transferred as part of the handover procedure. Rather, in accordance with example embodiments, the source base station 312 makes a determination that the target base station 314 is a relay base station. Then, in response to making the determination, the source base station refrains from transmitting at least a portion of the buffered downlink data to the target relay base station 314. The action of refraining from transferring at least some of the buffered data is represented in FIG. 3 by an indication that the buffered data packets DL1, DL2, ... DLn are discarded. In the figure, each packet is shown as "pulled" from the buffer and "x-ed" out. As a result of refraining from transferring buffered data to the target relay base station 314, there is a reduced burden on the X2 link, and correspondingly on the wireless backhaul.

In the example illustration, all the buffered packets appear to be discarded instead of transmitted to the target relay base station 312. In further accordance with example embodiments, the source base station 312 may selectively refrain from transmitting buffered downlink data. For example, source base station 312 may refrain from transmitting all or some user plane data, such as all or some keep-alive packets and/or all or some comfort noise data. Other criteria for selecting which buffered downlink data to omit from transfer and which to include in transfer are possible as well.

In accordance with example embodiments, a source base station can make a determination as to whether or not a target base station is a relay base station in response to initiation of a handover procedure with the target base station for handing over a WCD. For example, base stations in a wireless network may maintain a list of neighboring base stations (e.g., one or more tables or databases stored in solid state memory, magnetic disc, or the like), where each list entry (neighboring base station) may include, among other information, an indication as to whether or not it is a relay base station. Thus, when a handover of a given WCD is initiated, the serving (source) base station may consult its neighbor list to identify the target base station and determine if it is a relay base station. If the source base station, such as the base station 312, determines that the target base station, such as target relay base station 314, is a relay base station, then the source base station can responsively omit from transfer to the target base station some or all buffered downlink data for the given WCD. Example criteria for selective omission are described above. If the target base station is determined to not be a relay base station, the source base station may transfer buffered downlink data for the given WCD as in conventional handover procedures.

In addition to refraining (selectively or not) from transmitting buffered downlink data to a target base station that is a relay base station, as source base station may actively discard buffered data that are omitted from transfer. Additionally or alternatively, such data may be passively discarded by allowing their buffer locations to be overwritten as new data for the buffer arrive or are generated. The reduction or elimination of transmitted traffic on the wireless backhaul is achieved by refraining to transmit buffered downlink data to the target relay base station, in accordance with the description above. Thus, actively discarding some or all buffered downlink data prior to what might otherwise be transmission to the target base station can be taken as equivalent to refraining from transmitting those data that are actively discarded.

The example handover illustrated in accordance with example embodiments in FIG. 3 represents a configuration in which the relay base station and the serving base station to which it is connected via the air interface 309 are the target and source base stations, respectively. While the operation according to example embodiments entails determination that a target base station is a relay base station with a wireless backhaul to a serving base station, it need not be the case that the source base station is also the serving base station for the relay base station. For example, the source base station for a handover could be different from the serving base station of the relay base station. In this case, the source base station and the serving base station could be communicatively connected such that handover communications between the source base station and the target relay base station would be carried via the serving base station. The communication path would thus include the communicative connection between the source base station and the serving base station and the wireless backhaul between the serving base station and the target relay base station. For such a configuration, operation in accordance with example embodiments would still entail the source base station making a determination that the target base station is a relay base station, and then, in response, refraining from transmitting some or all buffered downlink data. The advantage of reduced traffic on the wireless backhaul would still be achieved.

In further accordance with example embodiments, the source base station could be a relay base station, such as relay base station 114, and the target base station could be a network base station, such as base station 112, both shown in FIG. 1. For a handover from the source (relay) base station to the target (network) base station in this scenario, the source base station itself being a relay base station would be the basis for refraining from transmitting some or all buffered downlink data to the target base station as part of the handover procedure. The advantage of reduced traffic on the wireless backhaul would again be achieved in this case as well. The determination that the source base station is a relay base station could be just a matter of "self-awareness" of the source base station or default operation. In a similar manner to that described above, the target base station need not be the serving base station of the relay base station, but could instead be communicatively connected to the serving base station.

The various configurations described above could be implemented collectively or selectively in a wireless communication system. That is, a wireless communication system could implement all or some or one of the configurations described above in accordance with example embodiments.

Figure 4:
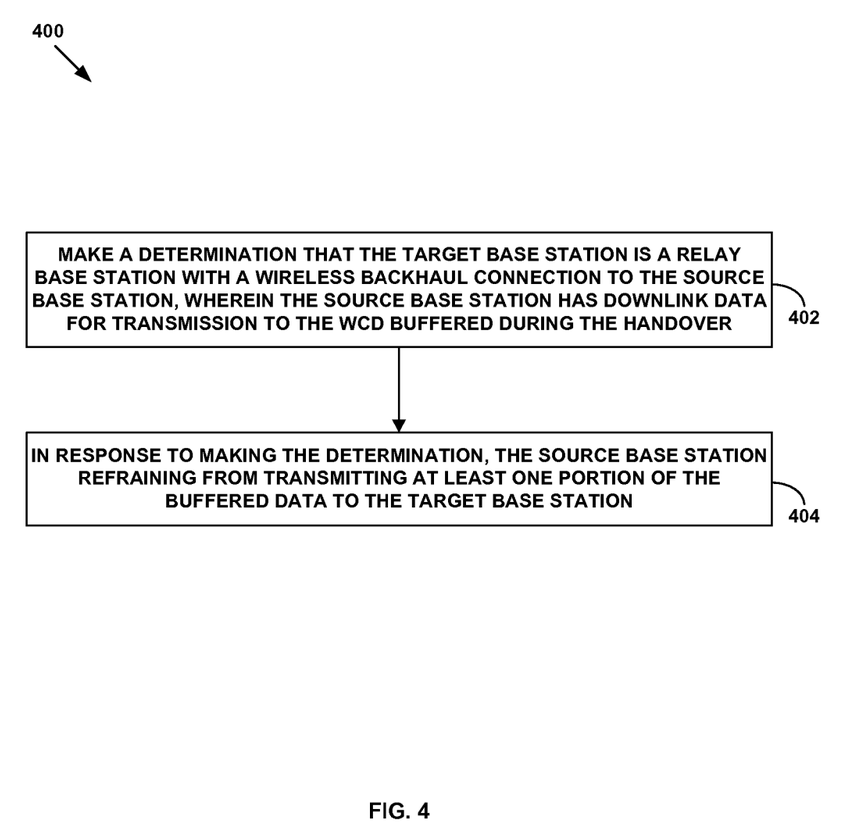
FIG. 4 is a flow chart depicting example operations in accordance with the disclosure.

FIG. 4 is a flowchart illustrating a method 400, according to an example embodiment. Illustrative methods, such as method 400, may be carried out in whole or in part by a base station, such as by the base station 312 or shown in FIG. 3. By way of example, the method 400 can be implemented as machine language instructions that can be stored on non-transitory machine-readable media (e.g, solid state memory, magnetic disk, etc.), and that when executed by one or more processors of a base station to cause the base station to carry out operations, steps, and/or functions of the method. In particular, the method 400 involves a method of data transfer during handover of a wireless communication device (WCD) from a source base station to a target base station.

As shown by block 402 in FIG. 4, the method 400 entails making a determination that the target base station is a relay base station with a wireless backhaul connection to the source base station. Further, the source base station may have downlink data for transmission to the WCD buffered during the handover.

As shown by block 404 in FIG. 4, method 400 next entails, in response to making the determination, the source base station refraining from transmitting at least one portion of the buffered data to the target base station. In accordance with example embodiments, the base station could refrain from transmitting all or some of the downlink data for the WCD buffered by the source base station during the handover.

In accordance with example embodiments, it is the source base station that makes the determination that the target base station is a relay base station. More specifically the source base station may access a neighbor list of neighboring base stations, where the neighbor list including indications of which neighboring base stations are relay base stations. The source base station may then determine that the target base station is on the neighbor list with an indication that the target base station is a relay base station.

In further accordance with example embodiments, the determination may be made at the start (e.g., initiation) of the handover, completion of the handover, or at some time between the start and the completion of the handover.

In accordance with example embodiments wherein the source base station may be communicatively coupled with a communications network, and may be configured for receiving downlink data for the WCD from the communications network. With this arrangement, the downlink data for transmission to the WCD buffered during the handover could include at least some downlink data for the WCD from the communications network received prior to completion of the handover and buffered by the source base station. For example, buffered downlink data could include downlink data received from the network prior to initiation of the handover, subsequent to initiation of the handover but prior to completion of the handover, or both.

In accordance with example embodiments, the buffered downlink data could include user-plane data for the WCD. More particularly, the user-plane data for the WCD include media data. By way of example, the user-plane data in the buffer that the source base station refrains from transmitting to the target base station could be comfort-noise data or keep-alive packets.

In accordance with example embodiments wherein the source and target base stations may be configured for operation in a Long-Term Evolution (LTE) communication system. In this arrangement, the wireless backhaul connection may be configured for support of control communications between LTE base stations according to an LTE X2 protocol.

In accordance with example embodiments the method 400 could further entail the source base station transmitting a different portion of the buffered data to the target base station as part of the handover. That is, the source base station could refrain from transmitting buffered downlink data to the target base station on a selective basis, such that some portion(s) of the buffered downlink data is (are) transmitted and another, different portion(s) is (are) not.

Figure 5:
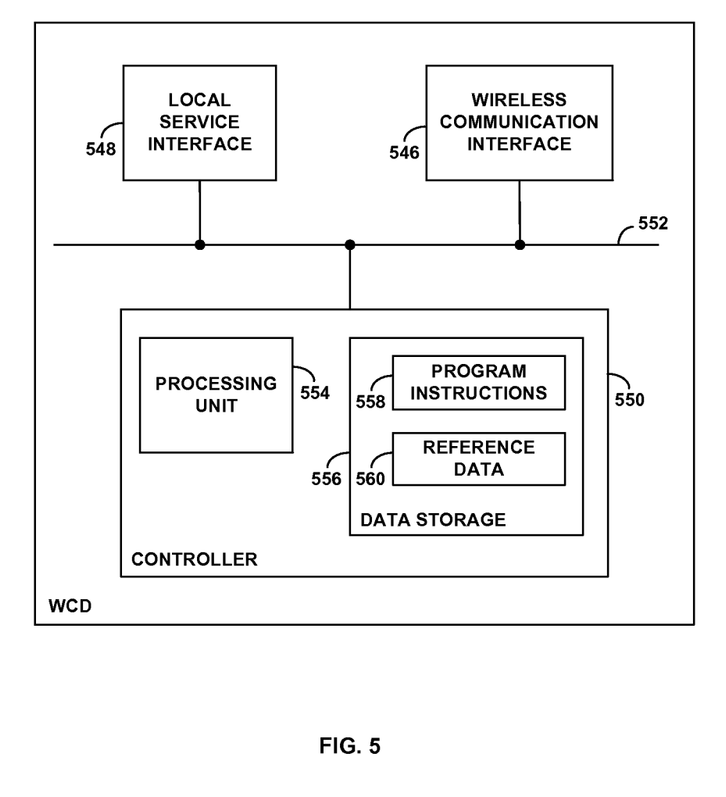
FIG. 5 is simplified block diagram of an example WCD operable in accordance with the disclosure.

FIG. 5 is next a simplified block diagram of a WCD, showing some of the components that such a device could include in accordance with an example implementation. In particular, the example WCD is configured to provide connectivity between at least one other device and the base station. Such a WCD could be a relay WCD or a hotspot/D2D node for instance.

As shown in FIG. 5, the example WCD includes a wireless communication interface 546, local service interface 548, and a controller 550, all of which could be coupled together or otherwise interconnected by a system bus, network, or other connection mechanism 552. Further, these or other components of the WCD could be integrated together in various ways. For instance, the controller could be provided as logic on a chipset that also serves as at least part of the wireless communication interface or local service interface. And the wireless communication interface and local service interface could be combined together. Further, the WCD could include other components and take other forms. For instance, if the WCD is user operated, the WCD could include a user interface. Other examples are possible as well.

In the example WCD, the wireless communication interface 546 could be configured to engage in wireless communication with the base station that serves the WCD, via a wireless channel between the WCD and the base station. As such, the wireless communication interface could include a radio compliant with the protocol that the WCD will use for communication with the base station, such as LTE for instance, and could further include an antenna structure for transmitting and receiving via the wireless channel.

The local service interface 548 could then be configured to engage in communication directly or indirectly with one or more other devices. For example, the local interface could be configured to communicate with a small cell base station that in turn serves one or more other devices, and/or the local interface could be configured to communicate more directly with one or more other devices. Further, the local service interface could provide for wired and/or wireless communication with the one or more other devices. For instance, the local service interface could include a wireless communication interface that operates to communicate with one or more other entities over the same air interface protocol used by wireless communication interface 546 or over a different air interface protocol. (By way of example, the wireless communication interface 546 could communicate with the serving base station according to LTE, and the local service interface 548 could communicate with other devices using LTE or using WiFi.) Alternatively, the local service interface could be configured for connection with a wired link such as an Ethernet connection or other cable connection with one or more other entities.

With these interfaces, the WCD could operate to be served by, and thus communicate data to and from, its serving base station on the one hand and to communicate data to and from one or more other devices on the other hand. Thus, the WCD could function as an intermediary providing connectivity between the one or more other devices and the base station.

The controller 550, in turn, could be configured to control operation of the WCD including implementing various WCD operations described herein.

As shown by way of example, the controller could include a processing unit 554 and data storage 556. Processing unit 554 could comprise one or more general purpose processors (e.g., microprocessors) and/or one or more special-purpose processors (e.g., application specific integrated circuits or digital signal processors). And data storage 556 could comprise one or more non-transitory volatile and/or non-volatile storage components, such as magnetic, optical, or flash memory, and could hold or be encoded with program instructions 558 and reference data 560. Program instructions 558 could be executable by processing unit 554 to carry out various WCD operations described herein. And reference data 560 could include various data to facilitate carrying out the operations, such as data indicating the extent to which the WCD provides connectivity between its serving base station and one or more other devices, and mapping data that correlates various channel state reporting rates with particular extents to which the WCD provides connectivity between its serving base station and one or more other devices.

Figure 6:
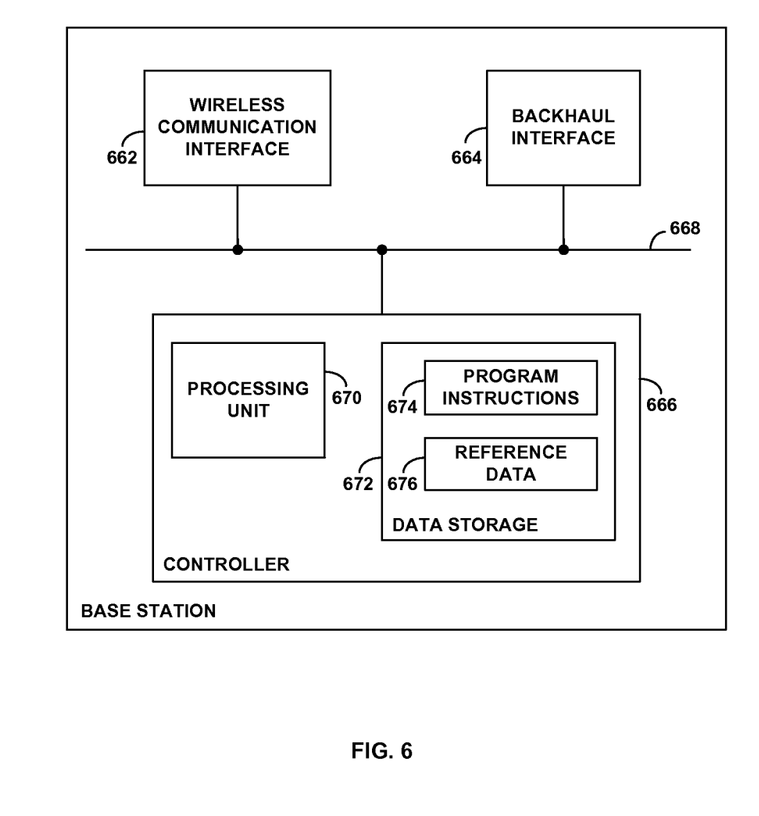
FIG. 6 is simplified block diagram of an example base station operable in accordance with the disclosure.

FIG. 6 is next a simplified block diagram of a base station (such as base station 112), showing some of the components that such an entity could include in accordance with an example implementation. In particular, the example base station is configured to act as a serving base station for a WCD, carry out steps to handover the WCD to a target base station, determine whether or not the target base station is a relay base station, and refrain from transmitting buffered downlink data for the WCD if the target base station is determined to be a relay base station. The example base station could be a macro base station of the type that typically includes a tower top antenna structure and provides a broad range of coverage, or the base station could be a small cell base station (e.g., femtocell, mini-macro, or the like) that typically has a smaller form factor and provides a narrower range of coverage. Under LTE, the base station could be an eNodeB. Under other protocols, the base station could take other forms.

As shown in FIG. 6, the example base station includes a wireless communication interface 662, a backhaul interface 664, and a controller 666, all of which could be coupled together or otherwise interconnected by a system bus, network, or other connection mechanism 668. Further, these or other components of the base station could be integrated together in various ways.

In the example base station, the wireless communication interface 646 could be configured to engage in wireless communication with a served WCD via a wireless channel between the base station and the WCD. As such, the wireless communication interface could include a radio compliant with the protocol that the base station will use for communication with the WCD station, such as LTE for instance, and could further include an antenna structure for transmitting and receiving via the wireless channel. The backhaul interface 664 may then be a wired or wireless interface for communicating with various core network entities, such as with an SGW and MME as discussed above for instance.

The controller 666, in turn, could be configured to control operation of the base station including implementing various base station operations described herein, such as acting as a serving base station for a WCD, carrying out steps to handover the WCD to a target base station, determining whether or not the target base station is a relay base station, and refraining from transmitting buffered downlink data for the WCD if the target base station is determined to be a relay base station.

As shown by way of example, the controller 666 could include a processing unit 670 and data storage 672. Processing unit 670 could comprise one or more general purpose processors (e.g., microprocessors) and/or one or more special-purpose processors (e.g., application specific integrated circuits or digital signal processors). And data storage 672 could comprise one or more non-transitory volatile and/or non-volatile storage components, such as magnetic, optical, or flash memory, and could hold or be encoded with program instructions 674 and reference data 676. Program instructions 674 could be executable by processing unit 670 to carry out various base station operations described herein. And reference data 676 could include various data to facilitate carrying out the operations, such as those described above.

Exemplary embodiments have been described above. Those skilled in the art will understand, however, that changes and modifications may be made to these embodiments without departing from the true scope and spirit of the invention.

What is claimed is:

1. A method of data transfer during handover of a wireless communication device (WCD) from a source base station to a target base station, the method comprising:

during the handover, making a determination that the target base station is a relay base station with a wireless backhaul connection to the source base station, wherein the source base station has downlink data for transmission to the WCD buffered during the handover; and in response to making the determination, the source base station refraining from transmitting at least one portion of the buffered data to the target base station, wherein making the determination comprises:

accessing a neighbor list of neighboring base stations of the source base station, the neighbor list including indications of which neighboring base stations are relay base stations; and determining that the target base station is on the neighbor list with an indication that the target base station is a relay base station.

2. The method of claim 1, wherein making the determination further comprises the source base station making the determination.

3. The method of claim 1, wherein making the determination further comprises making the determination at a particular time, the particular time being one of the start of the handover, completion of the handover, or a time between the start and the completion of the handover.

4. The method of claim 1, wherein the source base station is communicatively coupled with a communications network and is configured for receiving the downlink data for the WCD from the communications network,
and wherein the downlink data for transmission to the WCD buffered during the handover comprises at least some downlink data for the WCD from the communications network received prior to completion of the handover and buffered by the source base station.

5. The method of claim 1, wherein the at least one portion of the buffered data comprises all the downlink data for the WCD buffered by the source base station during the handover.

6. The method of claim 1, wherein the at least one portion of the buffered data comprises at least one portion of user-plane data for the WCD.

7. The method of claim 6, wherein the user-plane data for the WCD comprise media data, and wherein the at least one portion of the user-plane data is at least one of comfort-noise data or keep-alive packets.

8. The method of claim 1, wherein the source and target base stations are configured for operation in a Long-Term Evolution (LTE) communication system,
and wherein the wireless backhaul connection is configured for support of control communications between LTE base stations according to an LTE X2 protocol.

9. The method of claim 1, further comprising the source base station transmitting a different portion of the buffered data to the target base station as part of the handover, the different portion being buffered data other than the at least one portion.

10. A base station configured for transferring data during handover of a wireless communication device (WCD) from the base station to a target base station, the base station comprising:
an air interface for wireless communications with one or more WCDs;
one or more processors;
memory accessible by the one or more processors; and
machine-readable instructions stored in the memory, that upon execution by the one or more processors cause the base station to carry out operations including:
during the handover, making a determination that the target base station is a relay base station with a wireless backhaul connection to the base station, wherein the base station has downlink data for transmission to the WCD buffered during the handover; and
in response to making the determination, refraining from transmitting at least one portion of the buffered data to the target base station,
wherein making the determination comprises:
accessing a neighbor list of neighboring base stations of the source base station, the neighbor list including indications of which neighboring base stations are relay base stations; and
determining that the target base station is on the neighbor list with an indication that the target base station is a relay base station.

11. The base station of claim 10, wherein the base station is communicatively coupled with a communications network and is configured for receiving downlink data for the WCD from the communications network,
and wherein the downlink data for transmission to the WCD buffered during the handover comprises at least some downlink data for the WCD from the communications network received prior to completion of the handover and buffered by the base station.

12. The base station of claim 10, wherein the base station and the target base station are configured for operation in a Long-Term Evolution (LTE) communication system,
and wherein the wireless backhaul connection is configured for support of control communications between LTE base stations according to an LTE X2 protocol.

13. The base station of claim 10, wherein the operations further include transmitting a different portion of the buffered data to the target base station as part of the handover, the different portion being buffered data other than the at least one portion.

14. A non-transitory computer-readable medium having instructions stored thereon that, upon execution by one or more processors of a base station configured for transferring data during handover of a wireless communication device (WCD) from the base station to a target base station, cause the base station to carry out operations including:
during the handover, making a determination that the target base station is a relay base station with a wireless backhaul connection to the base station, wherein the base station has downlink data for transmission to the WCD buffered during the handover; and
in response to making the determination, refraining from transmitting at least one portion of the buffered data to the target base station,
wherein making the determination comprises:
accessing a neighbor list of neighboring base stations of the source base station, the neighbor list including indications of which neighboring base stations are relay base stations; and
determining that the target base station is on the neighbor list with an indication that the target base station is a relay base station.

15. The non-transitory computer-readable medium of claim 14, wherein making the determination further comprises making the determination at a particular time, the particular time being one of the start of the handover, completion of the handover, or a time between the start and the completion of the handover.

16. The non-transitory computer-readable medium of claim 14, wherein the at least one portion of the buffered data comprises at least one portion of user-plane data for the WCD, the user-plane data being at least one of comfort-noise data or keep-alive packets.

17. The non-transitory computer-readable medium of claim 14, wherein the base station and the target base station are configured for operation in a Long-Term Evolution (LTE) communication system,
and wherein the wireless backhaul connection is configured for support of control communications between LTE base stations according to an LTE X2 protocol.

18. The non-transitory computer-readable medium of claim 14, wherein the operations further include transmitting a different portion of the buffered data to the target base station as part of the handover, the different portion being buffered data other than the at least one portion.

* * * * *